(12) United States Patent
Schmid

(10) Patent No.: US 11,034,321 B2
(45) Date of Patent: Jun. 15, 2021

(54) AIR BAG MODULE

(71) Applicant: TRW Automotive GmbH, Alfdorf (DE)

(72) Inventor: Tatjana Schmid, Böbingen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 44 days.

(21) Appl. No.: 16/344,376

(22) PCT Filed: Oct. 19, 2017

(86) PCT No.: PCT/EP2017/076687
§ 371 (c)(1),
(2) Date: Apr. 24, 2019

(87) PCT Pub. No.: WO2018/077714
PCT Pub. Date: May 3, 2018

(65) Prior Publication Data
US 2019/0256033 A1 Aug. 22, 2019

(30) Foreign Application Priority Data
Oct. 24, 2016 (DE) .................. 10 2016 120 176.6

(51) Int. Cl.
*B60R 21/20* (2011.01)
*B60R 21/213* (2011.01)
(Continued)

(52) U.S. Cl.
CPC .......... *B60R 21/213* (2013.01); *B60R 21/201* (2013.01); *B60R 21/232* (2013.01); *B60R 21/237* (2013.01)

(58) Field of Classification Search
CPC ... B60R 21/237; B60R 21/201; B60R 21/213; B60R 21/232
(Continued)

(56) References Cited

U.S. PATENT DOCUMENTS 7,357,408 B2 * 4/2008 Hall ...................... B60R 21/213
280/728.2
7,547,038 B2 * 6/2009 Coleman ............... B60R 21/213
248/200
(Continued)

FOREIGN PATENT DOCUMENTS

DE 202004014219 12/2004
DE 102006061620 7/2008
(Continued)

*Primary Examiner* — Toan C To
(74) *Attorney, Agent, or Firm* — Tarolli, Sundheim, Covell & Tummino LLP

(57) ABSTRACT

An elongate airbag module (10) of a vehicle occupant restraint system includes a folded airbag (12) which is received in an envelope (14), wherein the envelope (14) includes a weakened zone through which the airbag (12) can deploy out of the envelope (14) upon activation of the airbag module (10), and wherein the envelope (14) comprises at least one elongate flexible fixing tab (16) having at least one opening (24*b*) by means of which the airbag module (10) can be fastened to a vehicle via a fastening clip (18) which in portions extends through the opening (24*b*). Portions of the fastening clip (18) are wrapped in the fixing tab (16).

12 Claims, 3 Drawing Sheets

(51) Int. Cl.
*B60R 21/201* (2011.01)
*B60R 21/232* (2011.01)
*B60R 21/237* (2006.01)

(58) Field of Classification Search
USPC .......................................... 280/728.2, 730.2
See application file for complete search history.

(56) References Cited

U.S. PATENT DOCUMENTS

| | | | | |
|---|---|---|---|---|
| 8,491,001 | B2* | 7/2013 | Baumgartner | B60R 21/201 |
| | | | | 280/728.2 |
| 2005/0046154 | A1* | 3/2005 | Rhea | B60R 21/213 |
| | | | | 280/728.2 |
| 2007/0090630 | A1* | 4/2007 | Wilmot | B60R 21/232 |
| | | | | 280/728.2 |
| 2008/0084050 | A1* | 4/2008 | Volkmann | B60R 21/213 |
| | | | | 280/728.2 |
| 2008/0284142 | A1 | 11/2008 | Cheal et al. | |
| 2011/0042921 | A1* | 2/2011 | Kjell | B60R 21/201 |
| | | | | 280/728.2 |
| 2015/0291119 | A1* | 10/2015 | Noma | B60R 21/201 |
| | | | | 280/728.2 |

FOREIGN PATENT DOCUMENTS

| | | |
|---|---|---|
| DE | 102011004049 | 6/2011 |
| DE | 102013217064 | 3/2015 |
| DE | 102015209111 | 10/2016 |

\* cited by examiner

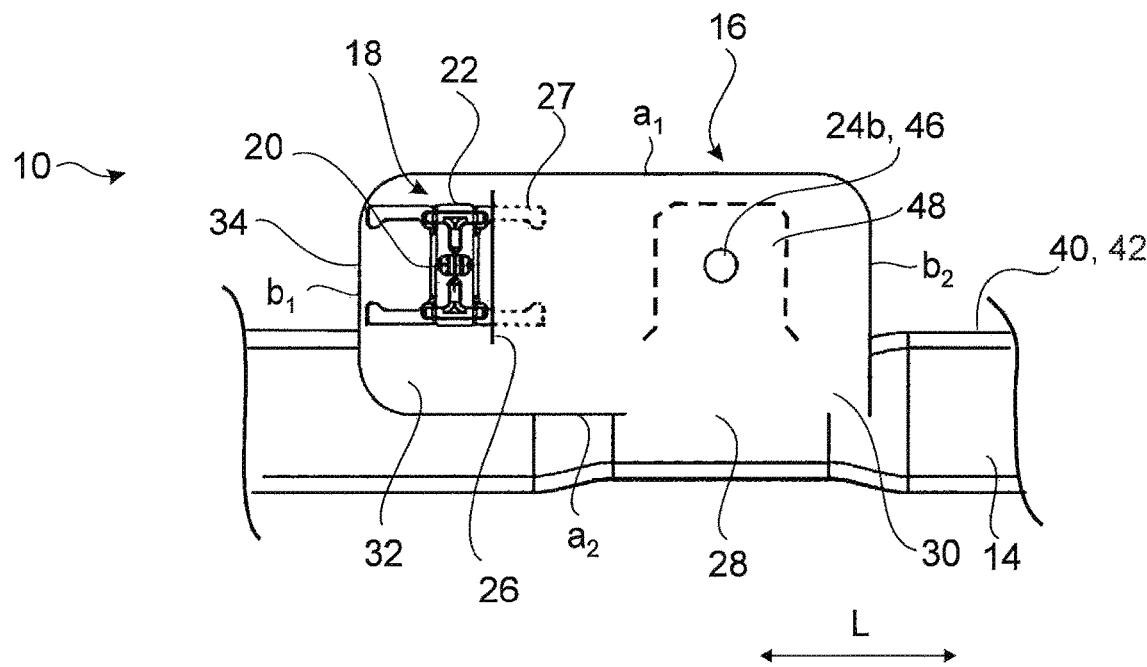

AIR BAG MODULE

RELATED APPLICATIONS

This application corresponds to PCT/EP2017/076687, filed Oct. 19, 2017, which claims the benefit of German Application No. 10 2016 120 176.6, filed Oct. 24, 2016, the subject matter of which are incorporated herein by reference in their entirety.

BACKGROUND OF THE INVENTION

The invention relates to an elongate airbag module of a vehicle occupant restraint system.

Side airbag modules are fastened to the roof rail of a vehicle according to a known procedure via fixing tabs projecting from the airbag which are provided along the airbag module, by fastening clips being inserted through openings in the fixing tabs and being latched in openings provided in the roof rail. In order to increase the assembling rate, it is aimed at pre-assembling the fastening clips to the airbag module.

For this purpose, in DE 10 2013 217 064 A1, for example, it was suggested to wrap the fastening clip into the fixing tab of the airbag prior to assembling the airbag module to the vehicle so that the fastening clip is inserted through a total of three openings in the fixing tab and the head of the fastening clip is wrapped in the fixing tab. In this way, the fastening clip can be pre-fixed to the airbag module without using any further fixing elements. For mounting the airbag module, furthermore merely the engaging portions have to be inserted into the opening in the vehicle body.

However, it is a drawback that the fixing tab has to be significantly longer than before so as to provide sufficient material for wrapping the fastening clip. This renders the fabrication more expensive and increases the waste when cutting the airbag parts.

SUMMARY OF THE INVENTION

It is the object of the invention to render manufacture more cost-efficient for an airbag module having a flexible fixing tab into which a fastening clip can be wrapped.

For an afore-mentioned airbag module this is achieved by the features of the claims. In the elongate airbag module of a vehicle occupant restraint system a folded airbag received in an envelope is provided, wherein the envelope has a weakened zone through which the airbag can deploy out of the envelope upon activation of the airbag module. The envelope includes at least one elongate flexible fixing tab having at least one opening by means of which the airbag module can be fastened to a vehicle via a fastening clip which in portions extends through the opening. Portions of the fastening clip are wrapped in the fixing tab. Since the fixing tab is not arranged on the airbag but is arranged on the envelope, the shape of the pre-cut part of the airbag, which is definitely more complicated than that of the envelope, may remain unchanged. Despite the additional fixing tab, it is more easily possible to determine suitable nesting, i.e. a suitable arrangement of the pre-cut parts on a fabric panel out of which the pre-cut parts are cut.

Preferably, the fixing tab is folded including the fastening clip inserted in the opening of the fixing tab so that the fastening clip is located at least in portions between fold layers of the fixing tab and thus is safely held by the fixing tab. The fastening clip may be wrapped into the fixing tab about 180°, about 360° or even about more than 360°.

The wrapping direction in which the fastening clip is wrapped into the fixing tab preferably is parallel to the longitudinal direction of the fixing tab.

The fastening clip typically comprises an engaging portion which engages in an opening at the vehicle body and usually is latched thereto, e.g. via appropriate locking projections. Moreover, it comprises a head which is coupled to the engaging portion and which is widened vis-à-vis the same. Those opening(s) in the fixing tab which serve for fastening to the vehicle basically have a smaller diameter than the head so that the fixing tab is locked through the head.

In the unfolded state, the fixing tab preferably extends toward a free end of the fixing tab substantially in parallel to a longitudinal direction of the airbag module.

Due to this design, the fixing tab may be placed along an edge of a pre-cut part, thus facilitating the nesting and minimizing any waste. Therefore, it is easily possible to cut out even a long fixing tab in one piece together with the respective pre-cut part. Consequently, the design according to the invention helps to facilitate manufacture of the airbag module while maintaining the advantages of simple and material-saving fixation of the fastening clips to the finished airbag module, and costs can be saved.

Preferably, all fixing tabs of the airbag module are designed as elongate fixing tabs aligned in parallel to the longitudinal direction of the airbag module at the envelope. However, it is, also imaginable to design one or more of the fixing tabs in a different shape and/or at the airbag.

Advantageously, the fixing tab includes plural openings and the fastening clip is wrapped in the fixing tab such that the engaging portion protrudes through plural superimposed openings so that the fastening clip is captively secured to the fixing tab.

One of the openings in the fixing tab may be in the form of slit and a part of a head of the fastening clip, especially an edge portion of the head, may be inserted through said slit. This opening is provided in addition to the openings through which the engaging portion of the fastening clip extends, and the engaging portion does not extend through said slit-shaped opening. The length of the fixing tab may be reduced in this way to save material.

The head is preferably designed to be out-of-round and the fixing tab is folded around an edge portion of the head. By insertion in portions into the slit-shaped opening, thus also the entire fastening clip is prevented from being rotated vis-à-vis the airbag module.

The head may be a spring, for example, especially a spring extending curved in cross-section, including edges inclined toward the engaging portion so as to reduce a bias acting on the latching connection to the vehicle body. In general, any type of fastening clip may be used within the scope of this invention, even fastening clips consisting of plural portions movable relative to each other which are pre-fixed in a pre-assembled position, where necessary, and adopt their final position not before they are inserted in the opening of the vehicle body. In this case, in its pre-assembled position the fastening clip is wrapped into the fixing tab and is fixed by the latter to the airbag module.

The fastening clip is preferably fastened to the airbag module only by being wrapped and inserted into the fixing tab. Further fixations for the fastening clip are usually not provided.

In order to lock the airbag together with the envelope tightly to the vehicle, at the airbag a fixing portion may be provided which includes an opening arranged so that in the mounted state it is aligned with the opening in the fixing tab of the envelope. The engaging portion of the fastening clip then extends also through the opening in the fixing portion of the airbag. The fixing clip is retained at the airbag module preferably solely by being wrapped into the fixing tab of the envelope, however.

The fastening clip is advantageously wrapped in the fixing tab which is folded several times so as to fix the fastening clip to the airbag module.

A favorable cutting form for the envelope, for which no additional material is required and no additional waste will occur, is resulting when the fixing tab is formed by an area cut out of the surface area of the envelope and thus is not attached to an outer edge of the pre-cut part of the envelope.

Preferably, the fixing tab includes a first portion which merges into the remainder of the envelope or of the airbag (depending on the part at which of said components the fixing tab is formed) and a second portion at which a free end of the fixing tab is located and which is connected to the remainder of the envelope or to the airbag via the first portion only.

When flatly spread, the fixing tab preferably takes an elongate and especially substantially rectangular shape.

When the fixing tab takes a rectangular shape, the only connection to the remaining element bearing the fixing tab exists, for example, through a portion of a longitudinal side of the rectangle.

This configuration is especially favorable when the fixing tab is cut out of the surface area of the envelope, as only a spiral cut following the two short sides and one of the longitudinal sides of the rectangle completely and the second longitudinal side approximately in half to three quarters has to be made for producing the fixing tab.

In all of said cases, there is retained a first portion which merges into the remainder of the pre-cut part of the envelope or of the airbag, as well as a second portion at which a free end of the fixing tab is located, with the second portion being connected to the remainder of the pre-cut part through the first portion only. The transition from the envelope or the airbag to the first portion and the transition from the first portion to the second portion never form a straight line but especially form a right angle.

If the fastening openings are intended to have a larger distance from the upper edge of the airbag, for example, the first portion may be lengthened in the direction perpendicular to the second portion, where necessary, so that the fixing tab adopts an angular shape.

The fixing tab may hang freely over at least half of its longitudinal extension, with the fastening clip being wrapped in the fixing tab preferably about 360°.

BRIEF DESCRIPTION OF THE DRAWINGS

Hereinafter, the invention shall be described in detail by way of an example embodiment with reference to the enclosed drawings, wherein:

FIG. 3 shows a schematic side view of an airbag module according to the invention illustrating a first step of wrapping the fastening clip into the fixing tab;

FIG. 4 shows the airbag module from FIG. 3 according to a second step of wrapping the fastening clip into the fixing tab;

DESCRIPTION

Figure 1:
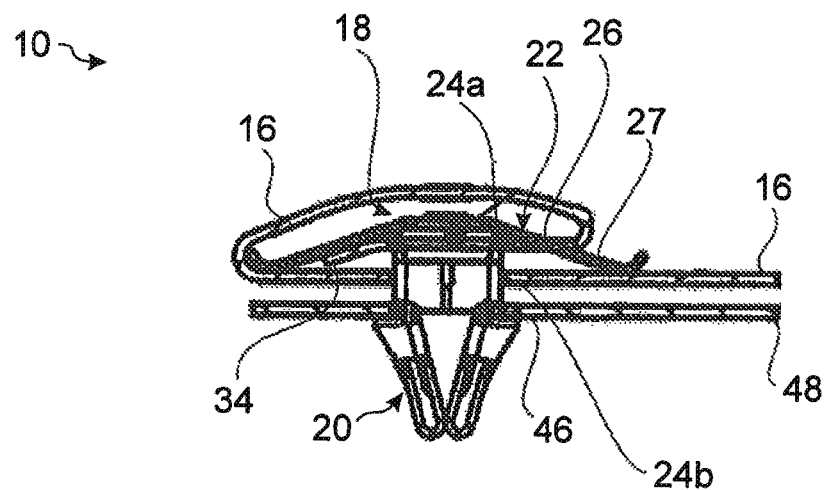
FIG. 1 shows a schematic sectional view of an airbag module according to the invention in the area of a fixing tab, along the line I-I in FIG. 5, wherein the fastening clip is wrapped in the fixing tab about 360°.

FIGS. 1 through 5 illustrate views of an airbag module 10 which in this case is an elongate side airbag module, as it is mounted for example on a roof rail of a passenger car in order to offer protection in the case of side impact.

The airbag module 10 comprises an airbag 12 (cf. FIGS. 4 and 5), in this case a side airbag which is only indicated in the Figures, as well as an envelope 14 surrounding the airbag 12 in the folded state. The envelope 14 includes, as is known, a weakened zone (not shown) which opens upon activation of the airbag module so that the airbag 12 can deploy unhindered.

In order to fasten the airbag module 10 to the vehicle, plural fixing tabs 16 are provided, only one of which is shown here, which are fixed to the vehicle body via a respective fastening clip 18.

The fixing tabs 16 are formed at the envelope 14.

The fastening clip 18 always is a separate part which has an engaging portion 20 as well as a head 22 connected thereto, the engaging portion 20 being inserted in an opening in the vehicle body and engaging behind the vehicle body by means of latching projections formed at the engaging portion 20, and in this way fixes the airbag module 10 to the vehicle.

The head 22 is widened vis-à-vis the engaging portion so that the fixing tab 16 is held between the vehicle body and the head of the fastening clip 18. The fastening clip 18 may be formed in various ways known from the state of the art, the exact shape and function of the latching on the vehicle is not decisive to the present invention.

The head 22 of the fastening clip 18 in this example is out-of-round and, in a top view, is H-shaped. Especially, the head 22 forms a spring extending in curved shape in cross-section and including edges inclined toward the engaging portion 20.

The fixing tab 16 extends in parallel to the longitudinal direction L of the airbag module 10 so that its longitudinal extension is parallel to the longitudinal direction L of the airbag module 10 and therefore is also denoted with "L" in this case.

Figure 6:
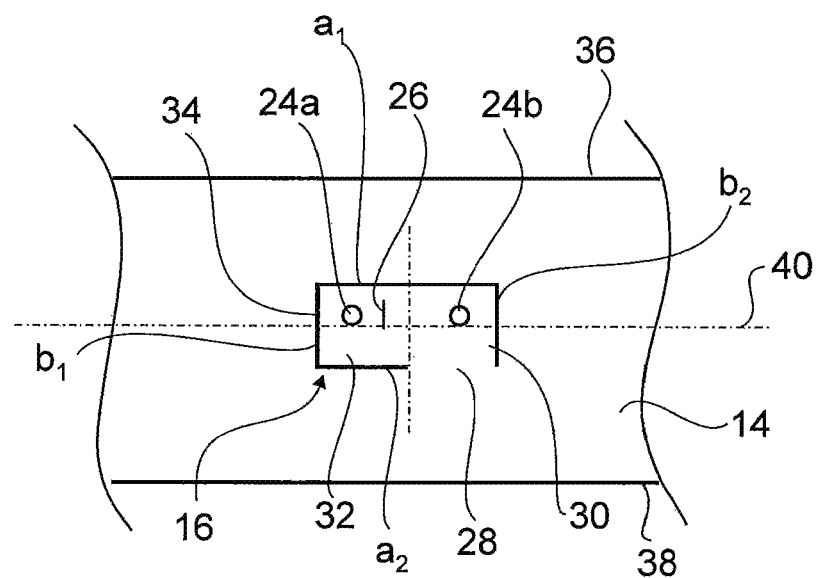
FIG. 6 shows a schematic top view onto a cutout of an envelope of an airbag module according to the invention in the area of a fixing tab.

In this example, the fixing tab 16 takes an elongate substantially rectangular shape, as is especially clearly visible in FIGS. 3, 6 and 7. In the fixing tab 16 plural openings 24a, 24b, 26 are provided.

The two openings 24a, 24b are circular in this case having a diameter which is larger than the diameter of the engaging portion 20 but smaller than that of the head 22, and they are located on a straight line in parallel to the longitudinal extension L.

In addition to the two openings 24a, 24b, a slit-shaped opening 26 is further provided which is equally located on the straight line connecting the openings 24a, 24b and between the two openings 24a, 24b. The slit-shaped opening 26 is longer than the diameter of the head 22 so that an edge portion 27 of the head 22 may be pushed therethrough, as shall be explained in the following.

The fixing tab 16 in this example is integrally connected to the remainder of the envelope 14. The transition 28 to the remainder of the envelope 14 is formed in a first portion 30 of the fixing tab 16. The first portion 30 merges into a second portion 32 which ends in a free end 34. An imaginary line from the surface area of the envelope 14 to the first portion 30 forms an angle with an imaginary line from the first portion 30 to the second portion 32, especially a 90° angle.

When the approximately rectangular outer circumference of the fixing tab 16 is described by two parallel longitudinal sides $a_1$, $a_2$ as well as two narrow sides $b_1$, $b_2$ which are perpendicular to the latter (cf. e.g. FIG. 3 for the purpose of clarification), the transition 28 to the envelope 14 is provided at one end of the longitudinal side $a_2$, whereas the remainder of the longitudinal side $a_2$ is suspended freely vis-à-vis the envelope 14. The narrow side $b_2$ adjacent to the transition 28 is equally free just as the longitudinal side $a_1$ as well as the narrow side $b_1$ which forms the free end 34. The transition 28 in this example accounts for about half the length of the longitudinal side $a_2$, but it might as well comprise a smaller part, up to about 25%.

The second portion 32 is connected to the envelope 14 only via the first portion 30 and in this example is completely freely suspended.

The (imaginary) division between the first and second portions 30, 32 of the fixing tab 16 is emphasized by a dot-dash separating line in FIGS. 6 and 7 which is perpendicular to the transition 28 at the end of the transition 28 on the longitudinal side $a_2$ and extends vertically.

FIG. 6 illustrates a possible arrangement of the fixing tab 16 relative to the envelope 14.

In this case, the fixing tab 16 is cut out of the surface area of the envelope.

The envelope 14 can be manufactured e.g. of a substantially rectangular pre-cut part. FIG. 6 shows a cutout from the pre-cut part of the envelope 14 in the area of one of the fixing tabs 16.

The upper and lower edges 36, 38 of the envelope 14 are laid around the folded airbag 12 so that a centerline 40 of the envelope 14 coincides with an upper edge of the airbag module 10 (see FIG. 3), wherein equally an upper edge 42 of the airbag 12 is arranged in the area of said centerline 40.

The fixing tab 16 is cut out symmetrically to said centerline by a spiral cut and then can be folded upwards around the transition 28 perpendicularly to the plane of projection. Of course, it is possible to reinforce the fixing tab 16 by reinforcing layers which are stitched to the fixing tab 16, if required.

In this example, the fixing tab 16 is arranged symmetrically to the centerline 40 with respect to its narrow sides $b_1$, $b_2$, with the openings 24a, 24b, 26 being displaced somewhat toward the free longitudinal side $a_1$, however, to obtain more free space for the fastening to the vehicle body. It is also imaginable to displace the fixing tab 16 somewhat with respect to the centerline 40 to take the frame geometry of the vehicle into account.

Figure 5:
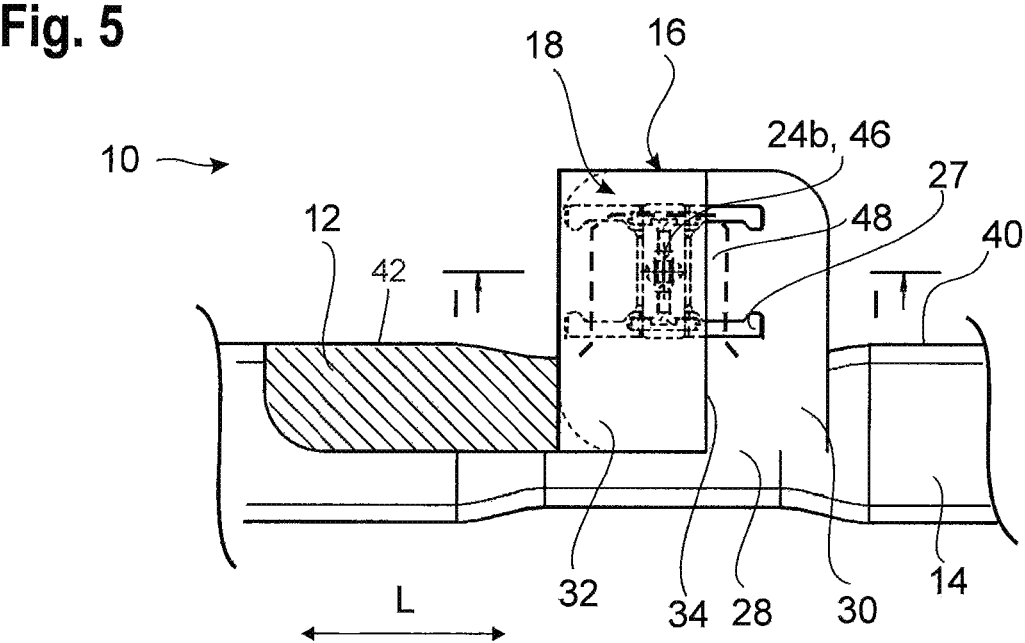
FIG. 5 shows the airbag module from FIG. 3 according to a third step of wrapping the fastening clip into the fixing tab, in the final mounting position.

The fastening clip 18 is pre-assembled on the airbag module 10. The steps required for this are shown in FIGS. 3 to 5.

Initially, the engaging portion 20 of the fastening clip 18 is pushed through the opening 24a which is closest to the free end 34, in this case into the image plane, so that the head 22 of the fastening clip 18 rests on the fixing tab 16.

A part of the head 22, in this case the edge portion 27 located on the right of the engaging portion 20, is pushed through the slit-shaped opening 26 to the rear side (in the Figures) of the fixing tab 16 so that it is covered by the material of the fixing tab 16 in FIG. 3 (indicated by broken lines). Due to the H shape of the head 22, the fastening clip 18 is protected against rotation about its longitudinal axis defined by the engaging portion 20.

In the next step, the fixing tab 16 is folded from the free end 34 once about 180° to the right along the longitudinal direction L. The result is shown in FIG. 4. Now the engaging portion 20 projects from the image plane, and the edge portion 27 of the head 22 is exposed on the left side. Since the fixing tab 16 was severed out of the surface area of the envelope, now an area of the folded airbag 12 previously covered by the fixing tab 16 is visible.

In the next and last wrapping step, the fixing tab 16 is further folded in the same folding direction (to the left in this case), with the engaging portion 20 being pushed through the second opening 24b.

Figure 2:
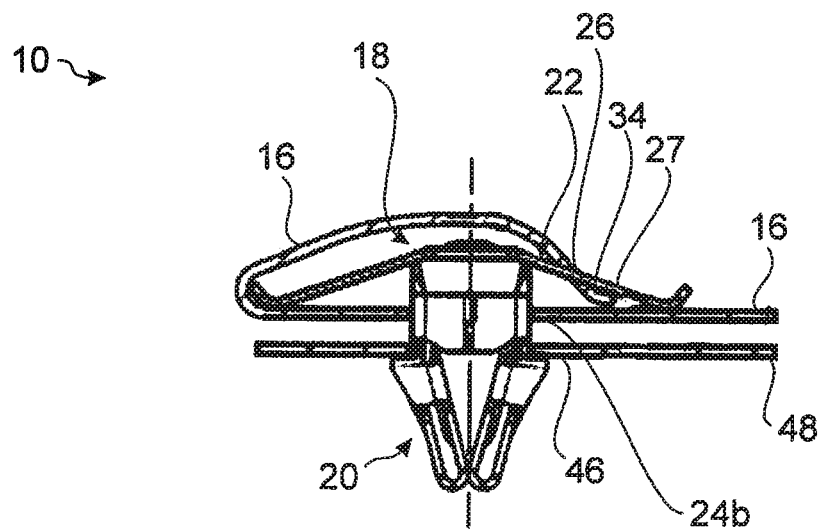
FIG. 2 shows a schematic sectional view of an airbag module according to the invention in the area of a fixing tab, wherein the fastening clip is wrapped in the fixing tab about 180°.

The result is shown in FIG. 5 and in a section is shown in FIG. 2. As is evident, the head 22 of the fastening clip 18 is wrapped once about 360° into the fixing tab 16 and the engaging portion 20 extends two times through the fixing tab 16, wherein the openings 24a, 24b now are superimposed.

The engaging portion 20 is pushed through the openings 24a, 24b so far that the latching projections of the engaging portion 20 engage behind the edge of the openings 24a, 24b and in this way prevent the fastening clip from slipping out of the openings 24a, 24b.

The fastening clip 18 is wrapped about 360° into the fixing tab 16, with the head 22 being located at least in portions between folding layers of the fixing tab 16 and being wrapped in the fixing tab 16 which is folded several times. From outside, merely the edge portion 27 of the head 22 is visible here.

After inserting the fastening clip 18 through the second opening 24b, the fastening clip is also pushed through an opening 46 in a fixing portion 48 projecting from the airbag 12, which opening is arranged so that the openings 24b, 46 are aligned. The engaging portion 20 also engages behind the edge of the opening 46 so that the fastening clip 18 is captively fixed to the envelope 14 and to the airbag 12 and is pre-assembled to the airbag module 10.

The fixing portion 48 on the airbag 12 in this case is a short tab projecting perpendicularly from the upper edge 42 of the airbag 12 and only includes one single opening 46. As the fastening clip 18 acts directly upon the airbag 12, a safe load-bearing connection is provided between the airbag 12 and the vehicle body.

All fixing tabs 16 of the airbag module 10 are provided with fastening clips 18 in this way. The airbag module 10 now may be mounted on the vehicle.

It would also be possible, as shown in FIG. 2, to design the fixing tab 16 to have one single opening 24b only and to wrap the fastening clip 18 about 180° only.

The invention claimed is:

1. An elongate airbag module (10) of a vehicle occupant restraint system, comprising a folded airbag (12) which is received in an envelope (14), wherein the envelope (14) includes a weakened zone through which the airbag (12) can deploy out of the envelope (14) upon activation of the airbag module (10), and wherein the envelope (14) comprises at least one elongate flexible fixing tab (16) having at least one opening (24a, 24b, 26) by means of which the airbag module (10) can be fastened to a vehicle via a fastening clip (18) which in portions extends through the opening (24a, 24b, 26), wherein portions of the fastening clip (18) are wrapped in the fixing tab (16).

2. The airbag module according to claim 1, wherein the fixing tab (16) including the fastening clip (18) inserted in the opening (24a, 24b, 26) of the fixing tab (16) is folded in such a way that the fastening clip (18) is located at least in portions between fold layers of the fixing tab (16).

3. The airbag module according to claim 1, wherein the fixing tab (16) in the unfolded state extends toward a free end (34) of the fixing tab (16) substantially in parallel to a longitudinal direction (L) of the airbag module (10).

4. The airbag module according to claim 1, wherein one or the openings (26) in the fixing tab (16) is in the form of a slit and in that the fastening clip (18) includes an engaging portion (20) and a head (22) coupled to said engaging portion (20) and widened vis-à-vis the latter, with an edge portion (27) of the head (22) protruding through the slit.

5. The airbag module according to claim 4, wherein the head (22) is designed to be out-of-round and the fixing tab (16) is folded around an edge portion of the head (22).

6. The airbag module according to claim 4, wherein the head (22) is configured as a spring, especially a spring extending in curved shape in cross-section, comprising two edges inclined toward the engaging portion (20).

7. The airbag module according to claim 4, wherein the engaging portion (20) includes latching projections.

8. The airbag module according to claim 1, wherein the fastening clip (18) is fastened to the envelope (14) by being wrapped and inserted into the fixing tab (16) only.

9. The airbag module according to claim 1, wherein at the airbag (12) a fixing portion (48) is provided which includes an opening (46) arranged in such a way that in the mounted state it is aligned with the opening(s) (24a, 24b) in the fixing tab (16) of the envelope (14), wherein the fastening clip (18) also extends through the opening (46) provided in the fixing portion (48) of the airbag (12).

10. The airbag module according to claim 1, wherein the fastening clip (18) is wrapped in the fixing tab (16) which is folded several times.

11. The airbag module according to claim 1, wherein the fixing tab (16) is formed by an area cut out of the surface area of the envelope (14).

12. The airbag module according to claim 11, wherein the fixing tab (16) includes a first portion (30) which merges into the envelope (14) and a second portion (32) which has a free end (34) and is connected to the remainder of the envelope (14) through the first portion (30) only.

* * * * *